A. M. HILBIG.
REPEATING DEVICE FOR SOUND REPRODUCING MACHINES.
APPLICATION FILED OCT. 20, 1917.

1,371,764.

Patented Mar. 15, 1921.

INVENTOR
Arthur Max Hilbig
By Morsell, Keeney & French
ATTORNEYS

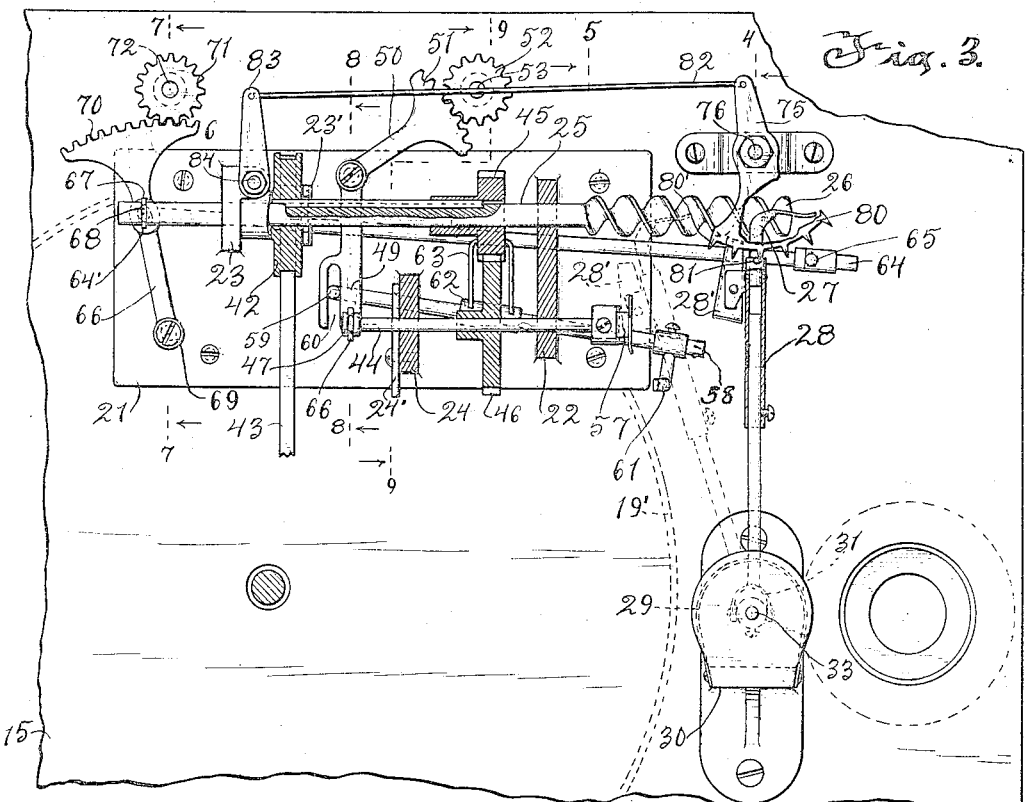

A. M. HILBIG.
REPEATING DEVICE FOR SOUND REPRODUCING MACHINES.
APPLICATION FILED OCT. 20, 1917.
1,371,764.
Patented Mar. 15, 1921.
3 SHEETS—SHEET 3.
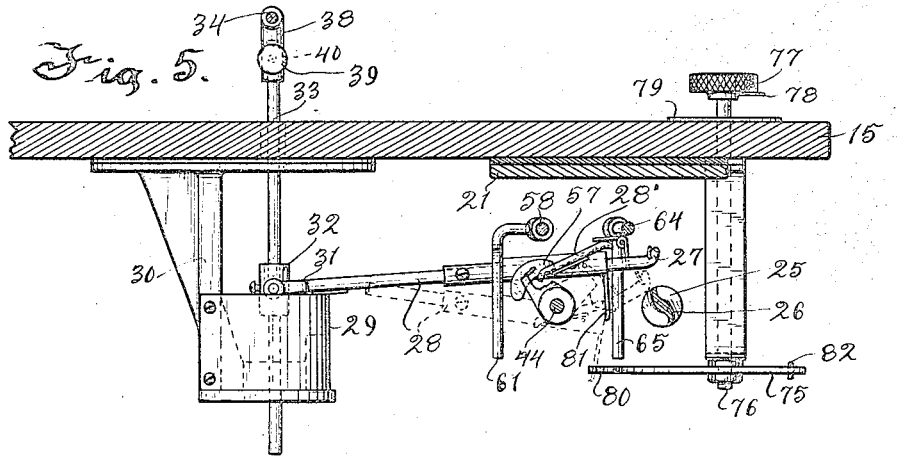
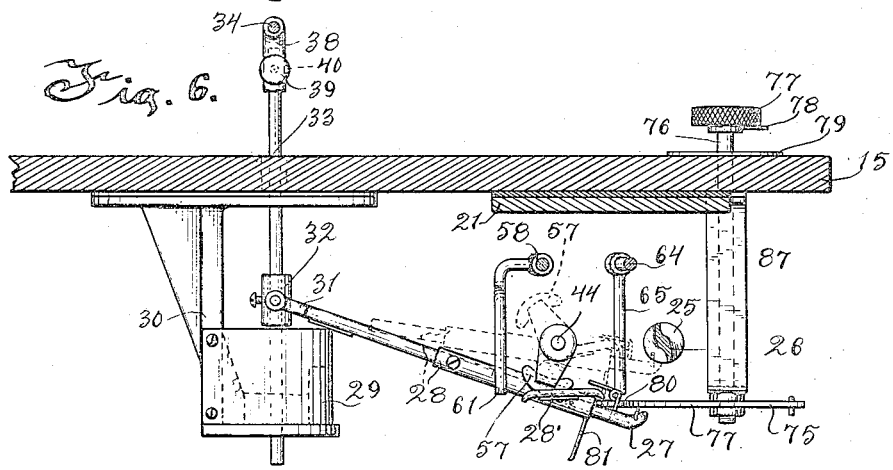
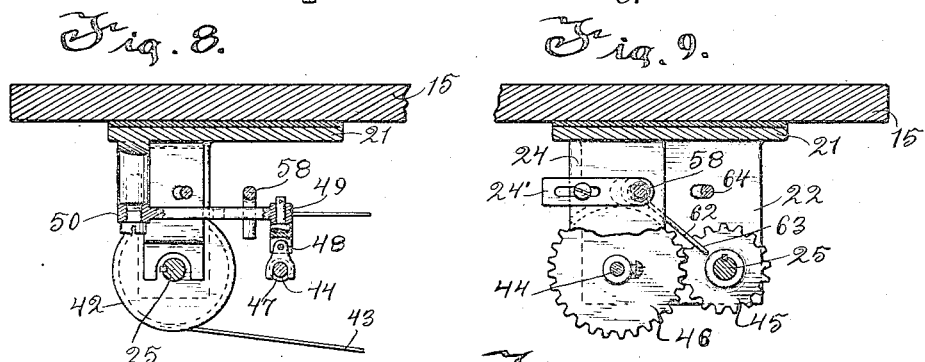
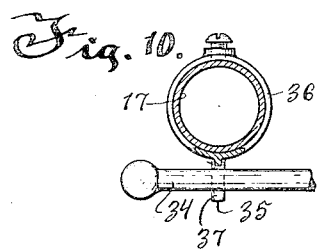
INVENTOR
Arthur Max Hilbig
By Morsell, Kinney & French
ATTORNEYS

UNITED STATES PATENT OFFICE.

ARTHUR MAX HILBIG, OF MILWAUKEE, WISCONSIN.

REPEATING DEVICE FOR SOUND-REPRODUCING MACHINES.

1,371,764.     Specification of Letters Patent.    Patented Mar. 15, 1921.

Application filed October 20, 1917. Serial No. 197,577.

*To all whom it may concern:*

Be it known that I, ARTHUR MAX HILBIG, a subject of the Emperor of Germany, have taken out my first papers as a citizen of the United States, a resident of Milwaukee, in the county of Milwaukee and State of Wisconsin, have invented new and useful Improvements in Repeating Devices for Sound-Reproducing Machines, of which the following is a description, reference being had to the accompanying drawings, which are a part of this specification.

This invention relates to improvements in a repeating device for sound reproducing machines.

It is one of the objects of the present invention to provide a repeating device for sound reproducing machines which will upon the completion of the playing of a record automatically raise the sound box stylus from the record and swing it to the initial or starting position and then lower the stylus to playing position.

A further object of the invention is to provide a repeating device for sound reproducing machines which may be adjusted to repeat the playing of records which vary in diameter and in length of record groove.

A further object of the invention is to provide a repeating device for sound reproducing machines which may be adjusted to repeat the playing of a record any number of times desired and automatically stop when the desired number has been played.

A further object of the invention is to provide a repeating device for sound reproducing machines which is of simple construction, is strong and durable and is well adapted for the purpose desired.

With the above and other objects in view the invention consists of the improved repeating device for sound reproducing machines and its parts and combinations as set forth in the claims, and all equivalents thereof.

In the accompanying drawing in which the same reference characters indicate the same parts in all of the views:

Fig. 3 is an inverted plan view of the repeating mechanism, parts being shown in section;

Fig. 4 is a transverse vertical sectional view taken on line 4—4 of Fig. 3;

Fig. 5 is a similar view taken on line 5—5 of Fig. 3;

Fig. 6 is a view similar to Fig. 5 with parts shown in a different position;

Fig. 7 is a vertical sectional detail view taken on line 7—7 of Fig. 3;

Fig. 8 is a vertical sectional detail view taken on line 8—8 of Fig. 3;

Fig. 9 is a similar view taken on line 9—9 of Fig. 3;

Fig. 10 is a vertical sectional detail view of the reproducer arm and parts connected thereto taken on line 10—10 of Fig. 1; and Fig. 11 is a side view of the parts shown in Fig. 10, some of the parts being shown in section.

Figure 1:
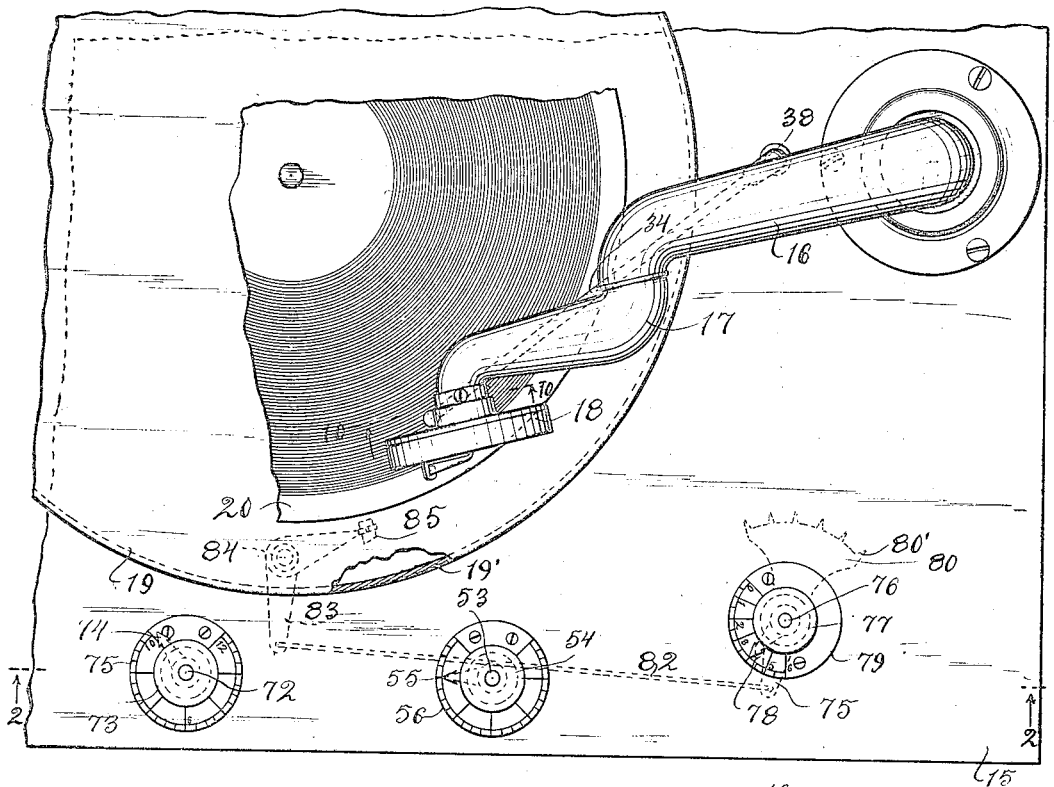
Figure 1 is a top view of a portion of a sound reproducing machine provided with the improved repeating device.

Referring to the drawings the numeral 15 indicates the support or case, 16 the reproducer swing arm, 17 the tiltable portion thereof, 18 the reproducer or sound box, 19 the turn table and 20 the record mounted thereon. All of the parts mentioned are of ordinary form and operate in the ordinary manner.

On the lower surface of the upper portion of the casing is mounted a frame 21 provided with depending bearings 22 and 23 for supporting mechanism of the improved repeating device. A main shaft 25 journaled and slidably mounted in the bearings 22 and 23 is provided with a threaded extension 26 similar to a wood auger which is engaged by the right angular end portion 27' of the pivoted end 27 of a lever arm 28. The pivotal connection of said end permitting the end to swing only upwardly so that when the end of the record has been reached the free end of lever arm 28 can drop beneath the threaded part 26 and in position to be removed to repeating position. The right angular part of the pivoted end portion 27 is of greater length than the space between the threads and prevents said part entering between the threads of the threaded portion of the shaft 26 when bearing upwardly against the threaded part and when the parts are being moved to starting position. This lever arm is medially fulcrumed upon the upper edge portion of a semicircular fulcrum member 29 which forms part of a bearing bracket 30 mounted on the casing. The inner or short end 31 of the lever arm is bifurcated and straddles and is pivoted to a collar 32 mounted on a vertically extending rock shaft 33 which is journaled in the bracket bearing 30. The upper end portion of the rock shaft 33 extends through the upper portion of the casing adjacent the inner end of the swing arm 16 and has adjustably mounted thereon a setting arm 34 which extends beneath and toward the outer free end of said swing arm. The outer end portion of the setting arm is straddled by the downwardly extending fingers 35 of a collar 36 which is mounted on the tiltable portion 17 of the swing arm. The said fingers are preferably covered with rubber tubing 37 to cushion the points of contact and prevent vibration.

The tiltable portion of the swing arm is adapted to be lifted from the record when the end of the piece has been reached and swung outwardly to the initial starting point by the setting arm and to accommodate records of different diameters and lengths the inner end of the setting arm is in the form of an elbow 38 which slips over the upper end of the vertical shaft and is circumferentially adjustably fastened thereto by a thumb screw 39 which threads through the elbow and impinges against the shaft. A pin 40 projecting transversely from the rock shaft and through a bayonet slot 41 formed in the elbow limits the adjustment of the arm to play the largest or the smallest record.

The main shaft 25 has mounted thereon a grooved pulley 42 which is adapted to be drivingly connected to the mechanism (not shown) for rotating the turn table 19 by a belt 43.

Positioned alongside of the main shaft 25 and journaled in the bearings 22 and 24 is a counter shaft 44 which is geared to the main shaft 25 by gears 45 and 46, the gear 45 being slidably splined on the main shaft 25. The belt pulley 42 is also splined on the main shaft to permit the shaft to be moved endwise with relation thereto and said pulley is prevented from moving with the shaft by an arm 23' which extends downwardly from the frame 21 and holds the pulley between the said arm and the bearing 23. One end of the counter shaft 44 is formed with an annular groove 47 which is engaged by the lower forked ends of a connector member 48 which in turn is pivotally connected at its upper end to one end 49 of a bell crank lever 50 to form substantially a universal joint connection therewith. The bell crank lever 50 is fulcrumed on the frame and its opposite end extends horizontally and is provided with segmental teeth 51 which are in mesh with a pinion 52. The said pinion is mounted on a short shaft 53 journaled in the frame and which extends through the top of the case and is provided with a knurled enlargement or handle 54 on its upper end for convenience in turning the same. The handle is provided with a pointer 55 which coacts with a dial 56 to indicate the amount of adjustment to accommodate the device to play records of varying lengths, this adjustment providing more particularly for disengaging the stylus from the record when it has reached the inner or terminal end of the record groove. The opposite end of the counter shaft 44 is provided with a hook cam member 57 which engages a projecting portion 28' of the lever arm 28 and forces said arm downwardly to its lowermost position, the pivoted end portion 27 of the arm permitting the said arm to pass below the threaded portion of the main shaft medially of the length of the shaft when the arm is in its lower position. When the hook cam member disengages the projecting portion 28' of the arm the said arm will swing upwardly until its pivoted end engages the lower side of the threaded portion of the main shaft 25 and the turning of the said main shaft will swing the arm toward the outer end of the threaded portion and when it reaches the end of said threaded portion it will swing to its upper position above the threaded portion.

The parts are so adjusted that when the stylus travels in the groove of the record the free end of the lever arm 28 will rest on and travel in the upper portion of the threaded part and toward the inner end of the main shaft 25, and when the stylus reaches the end of the record the lever arm will also reach a position to be engaged by the rotating hook cam member and be swung beneath the main shaft. This movement will raise the stylus, which is indirectly supported on the short end of the lever arm 28, out of the record groove and the said stylus will be swung outwardly to the initial or starting point of the groove by the movement imparted to the lever arm, and the engagement of said lever arm with the lower portion of the threaded part of the main shaft. When the lever arm reaches the end of the threaded portion of the shaft the weight of the sound box indirectly resting on the short inner end of the lever arm, or the part between the fulcrum member 29 and the shaft 33, will swing the longer end of said arm upwardly above the threaded portion and this movement will drop the stylus into the record groove to repeat the playing of the record.

A stop rod 58 slidably mounted in the bearing 22 and adjustably mounted in the bearing 24' and extending at an angle with relation to the counter shaft 44 is provided with an angularly projecting end portion 59 which extends through an elongated slot 60 formed in the arm 49 of the bell crank lever 50 so that said stop rod will be reciprocated by the said bell crank lever. The outer end portion of said stop rod adjustably carries a stop arm 61 of angular form which stops the movement of the lever arm in a position to be engaged by the rotating hook cam member.

The stop rod also carries a gear shifter 62 having projecting fingers 63 which straddle the gear 45 and holds it in mesh with the gear 46 at all times.

Figure 2:
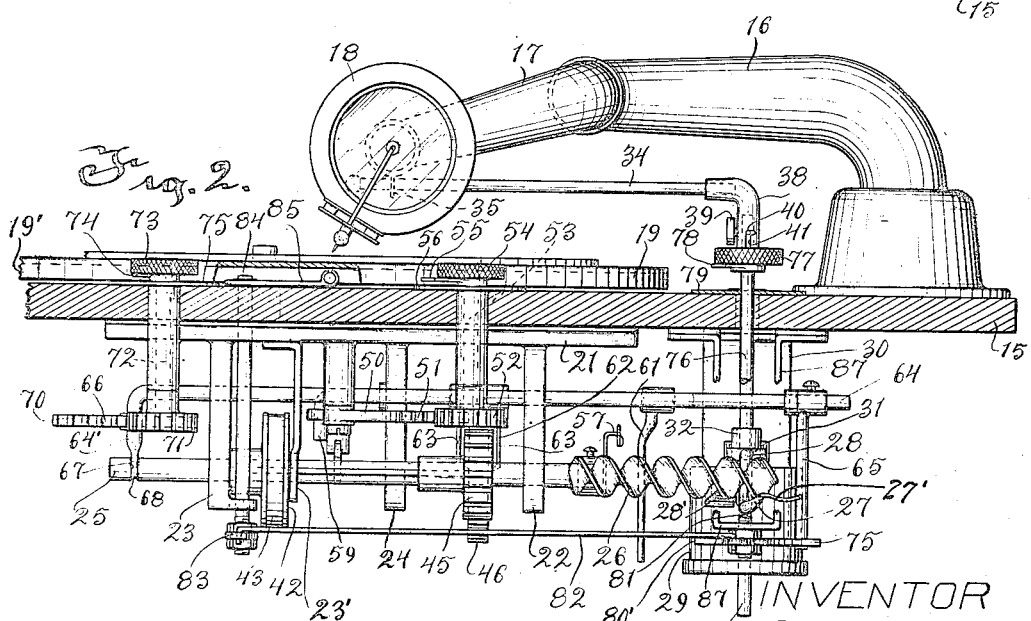
Fig. 2 is a vertical sectional view thereof taken on line 2—2 of Fig. 1.

In order to adjust the position of the outer end portion of the threaded part of the main shaft with relation to the outer diameter of the record groove of the record, a rod 64 is slidably mounted in the bearings 22 and 23 and adjustably carries a stop finger 65 which extends in line of travel of the lever arm 28 and in front and to one side of the free end of the threaded portion 26 of the main shaft 25 a sufficient distance to permit the lever arm 28 to freely swing upwardly between the outer end of said lever arm and the said finger. The movement of the lever arm horizontally is thus limited so that in repeating the playing of a record the stylus cannot accidentally swing off the outer edge of the record. The inner end portion 64' of the slidable rod 64 is bent downwardly at right angles and extends medially pivotally through a segmental arm 66 and its lower bifurcated end portion 67 straddles the grooved portion 68 of the main shaft 25 so that both the main shaft 25 and the slidable rod 64 are similarly moved endwise and bear a fixed relation to each other. A finger 23' bearing against one side of the pulley 42 close to the hub thereof holds said pulley in position between the said finger and the bearing 23 as clearly shown in Fig. 2. The segmental arm 66 at its inner end is connected to the main frame 21 by a pivot screw 69 and at its outer end is provided with segmental teeth 70 which are in mesh with an adjusting pinion 71 mounted on the lower end of a short shaft 72 which extends upwardly through the case and at its upper end is provided with a knurled head or handle 73 having a pointer 74 which coacts with the dial plate 75 in indicating the position to set the main shaft to play a record of a certain size.

The invention also provides for repeating the playing of the records a predetermined number of times as desired by the operator and this portion of the device comprises a repeating lever 75 medially mounted on the lower end portion of a shaft 76 which extends through the case and is provided with a knurled handle 77 having a pointer 78 which coacts with a dial plate 79 in indicating the number of times the playing of the record is to be repeated. One end of this repeating lever is of segmental form and is provided with pointed teeth 80 corresponding in number to the number of times the playing of the record may be repeated.

The teeth are engaged by a pin 81 which projects downwardly from the free end portion of the lever arm 28 and the said repeating lever is moved the distance of one tooth each time the lever arm 28 is swung from its inner position to its outer position. The end of the repeating lever opposite to the end provided with the pointed segmental teeth has a link connection 82 with the arm 83 of a brake shaft 84 journaled in the frame 21 and extending through the case 15. A brake arm 85 mounted on the upper end of the brake shaft 84 is positioned to be swung against the downwardly extending annular flange 19' of the platen or turntable 19 when the last tooth 80' of the repeating lever 75 has been engaged and moved by the pin 81 of the swing arm so that if the repeating handle has been set to play the record three times the swing arm pin will first engage the third tooth of the repeating lever and move it the distance of one tooth at the playing the first time, at the second playing the second tooth will be engaged and moved and at the third playing the first or initial tooth will be engaged and move the brake arm 85 into braking engagement with the turntable and stop the machine.

A coiled spring 86 surrounding the shaft 76 and interposed between the bearing 87 of said shaft and a collar 88 mounted on the shaft holds the repeating lever 75 in its upper pin engaging position and also provides sufficient friction between the parts to maintain them in adjusted position. This spring construction also permits the adjustment of the repeating lever by pushing it downwardly out of engagement with the swing arm pin to permit the turning of the repeating lever in the event that the machine stops with the parts in engagement with each other as shown in Fig. 4.

From the foregoing description it will be seen that the repeating device is well adapted for the purpose desired.

What I claim as my invention is:

1. The combination with a sound reproducing machine provided with a turntable and a record and a tiltable swing arm having a sound box and stylus, of a repeating device therefor, comprising a mechanism for disengaging the stylus from the record when the stylus has reached the end of the record and moving the stylus to the initial point of the record and in engagement therewith, said mechanism in part consisting of a threaded member which moves the tiltable swing arm from the terminal to the initial point of the record, and a lever arm for raising and lowering the tiltable arm from and to the record, and means for actuating the mechanism.

2. The combination with a sound reproducing machine provided with a turntable and a record and a tiltable swing arm having a sound box and stylus, of a repeating device therefor, comprising a main shaft having a threaded portion, a lever arm connected to the tiltable swing arm, means for moving the lever arm into engagement with the threaded portion of the main shaft, and means for actuating the mechanism.

3. The combination with a sound reproducing machine provided with a turntable and a record and a tiltable swing arm having a sound box and stylus, of a repeating device therefor, comprising a main shaft having a threaded portion, a lever arm connected to the tiltable swing arm and being moved thereby when the stylus is disengaged from the record, a cam means for moving the lever arm into engagement with the threaded portion of the main shaft, and means for actuating the mechanism.

4. The combination with a sound reproducing machine provided with a turntable and a record and a tiltable swing arm having a sound box and stylus, of a repeating device therefor, comprising a main shaft having a threaded portion, a lever arm engaging the threaded portion of the main shaft and being moved thereby when the stylus disengages the record, a setting arm connected thereto and to the tiltable swing arm, a cam means for moving the lever arm into engagement with the threaded portion of the main shaft, and means for actuating the mechanism.

5. The combination with a sound reproducing machine provided with a turntable and a record and a tiltable swing arm having a sound box and stylus, of a repeating device therefor, comprising a main shaft having a threaded portion, a lever arm engaging the threaded portion of the main shaft and being moved thereby when the stylus disengages the record, a setting arm connected to the lever arm and to the tiltable swing arm, a counter shaft having a cam member for moving the lever arm into engagement with the threaded portion of the main shaft when the stylus has reached the end of the record, and means for actuating the mechanism.

6. The combination with a sound reproducing machine provided with a turntable and a record and a tiltable swing arm having a sound box and stylus, of a repeating device therefor, comprising a main shaft having a threaded portion, a lever arm having a pivoted end portion positioned to engage the threaded portion, a setting arm connected to the lever arm and to the tiltable swing arm, a counter shaft having a cam member for moving the lever arm from a position above the main shaft to a position below and in engagement with the main shaft when the stylus has reached the end of the record, and means for actuating the mechanism.

7. The combination with a sound reproducing machine provided with a turntable and a record and a tiltable swing arm having a sound box and stylus, of a repeating device therefor, comprising a main shaft having a threaded portion, a lever arm having a pivoted end portion positioned to engage the threaded portion, a setting arm connected to the lever arm and to the tiltable swing arm, a counter shaft having a cam member for moving the lever arm from a position above the main shaft to a position below and in engagement with the main shaft when the stylus has reached the end of the record, means for adjusting the main shaft endwise, and means for rotating the main shaft.

8. The combination with a sound reproducing machine provided with a turntable and a record and a tiltable swing arm having a sound box and stylus, of a repeating device therefor, comprising a main shaft having a threaded portion, a lever arm having a pivoted end portion positioned to engage the threaded portion, a setting arm connected to the lever arm and to the tiltable swing arm, a counter shaft having a cam member for moving the lever arm from a position above the main shaft to a position below and in engagement with the main shaft when the stylus has reached the end of the record, means for adjusting the main shaft endwise, means for adjusting the counter shaft endwise, and means for rotating the main shaft.

9. The combination with a sound reproducing machine provided with a turntable and a record and a tiltable swing arm having a sound box and a stylus, of a repeating device therefor, comprising a main shaft having a threaded portion, a lever arm having a pivoted end portion positioned to engage the threaded portion, a setting arm connected to the lever arm and to the tiltable swing arm, a counter shaft having a cam member for moving the lever arm from a position above the main shaft to a position below and in engagement with the main shaft when the stylus has reached the end of the record, a geared connection between the two shafts which permits the endwise movement of either shaft, and means for rotating the main shaft.

10. The combination with a sound reproducing machine provided with a turntable and a record and a tiltable swing arm having a sound box and a stylus, of a repeating device therefor, comprising a main shaft having a threaded portion, a lever arm having a pivoted end portion positioned to engage the threaded portion, said lever arm having a sliding engagement with its fulcrum, a setting arm connected to the lever arm and to the tiltable swing arm, a counter shaft having a cam member for moving the lever arm from a position above the main shaft to a position below and in engagement therewith when the stylus reaches the end of the record, a stop finger adjustably positioned adjacent the main shaft, means for adjusting the main shaft and the stop finger, means for adjusting the counter shaft endwise, and means for rotating the main shaft.

11. The combination with a sound reproducing machine provided with a turntable and a record and a tiltable swing arm having a sound box and a stylus, of a repeating device therefor, comprising a main shaft having a threaded portion, a lever arm having a pivoted end portion positioned to engage the threaded portion, said lever arm having a sliding engagement with its fulcrum, a setting arm connected to the lever arm and to the tiltable swing arm, a counter shaft having a cam member for moving the lever arm from a position above the main shaft to a position below and in engagement therewith when the stylus reaches the end of the record, a stop finger adjustably positioned adjacent the main shaft, means for adjusting the main shaft and the stop finger, means for adjusting the counter shaft endwise, and means for rotating the main shaft.

12. The combination with a sound reproducing machine provided with a turntable and a record and a tiltable swing arm having a sound box and a stylus, of a repeating device therefor, comprising a main shaft having a threaded portion, a lever arm having a pivoted end portion positioned to engage the threaded portion, said lever arm having a sliding engagement with its fulcrum, a setting arm connected to the lever arm and to the tiltable swing arm, a counter shaft having a cam member for moving the lever arm from a position above the main shaft to a position below and in engagement therewith when the stylus reaches the end of the record, a stop finger adjustably positioned adjacent the main shaft, means for adjusting the main shaft and the stop finger, means for adjusting the counter shaft endwise, a segmental gear lever positioned to be engaged by the lever arm each time the playing of the record is repeated, and means for rotating the main shaft.

13. The combination with a sound reproducing machine provided with a turntable and a record and a tiltable swing arm having a sound box and a stylus, of a repeating device therefor, comprising a main shaft having a threaded portion, a lever having a pivoted end portion positioned to engage the threaded portion and be moved thereby, said lever arm having a sliding engagement with its fulcrum, a setting arm connected to the lever arm and to the tiltable swing arm, a counter shaft having a cam member for moving the lever arm from a position above the main shaft to a position below and in engagement therewith when the stylus reaches the end of the record, a stop finger adjustably positioned adjacent the main shaft, means for adjusting the main shaft and the stop finger, means for adjusting the counter shaft endwise, a segmental gear lever positioned to be engaged by the lever arm and moved the distance of one tooth each time the playing of the record is repeated, a brake positioned to engage the turntable, a link connecting the segmental gear to the brake to move said brake, means for adjusting the segmental gear to play a record a predetermined number of times before it moves the brake, and means for rotating the main shaft for actuating all of the parts.

In testimony whereof I affix my signature.

ARTHUR MAX HILBIG.